US009381496B2

(12) United States Patent
Takeshima et al.

(10) Patent No.: US 9,381,496 B2
(45) Date of Patent: Jul. 5, 2016

(54) NANOPARTICLE CARRYING METHOD

(75) Inventors: Shinichi Takeshima, Numazu (JP); Toru Sasatani, Obu (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 12/673,021

(22) PCT Filed: Mar. 18, 2009

(86) PCT No.: PCT/JP2009/056014
§ 371 (c)(1),
(2), (4) Date: Feb. 11, 2010

(87) PCT Pub. No.: WO2010/106693
PCT Pub. Date: Sep. 23, 2010

(65) Prior Publication Data

US 2012/0004094 A1 Jan. 5, 2012

(51) Int. Cl.

| | |
|---|---|
| ***B01J 23/10*** | (2006.01) |
| ***B01D 53/94*** | (2006.01) |
| ***B01J 35/00*** | (2006.01) |
| ***B01J 23/745*** | (2006.01) |
| ***B01J 37/02*** | (2006.01) |
| ***B01J 37/03*** | (2006.01) |
| ***B01J 21/04*** | (2006.01) |

(52) U.S. Cl.
CPC ............. *B01J 23/10* (2013.01); *B01D 53/9422* (2013.01); *B01J 23/745* (2013.01); *B01J 35/006* (2013.01); *B01J 35/0013* (2013.01); *B01J 37/0207* (2013.01); *B01J 37/0211* (2013.01); *B01J 37/031* (2013.01); *B01D 2255/2065* (2013.01); *B01D 2255/2092* (2013.01); *B01D 2255/20707* (2013.01); *B01D 2255/20738* (2013.01); *B01D 2255/91* (2013.01); *B01D 2255/9202* (2013.01); *B01J 21/04* (2013.01)

(58) Field of Classification Search
None
See application file for complete search history.

(56) References Cited

U.S. PATENT DOCUMENTS

| | | | | |
|---|---|---|---|---|
| 5,753,581 | A | 5/1998 | Beckmeyer et al. | |
| 6,753,351 | B2 * | 6/2004 | Clark et al. | 518/700 |
| 2007/0197379 | A1 * | 8/2007 | Miura | 502/304 |
| 2008/0241467 | A1 | 10/2008 | Ohno et al. | |
| 2009/0048101 | A1 | 2/2009 | Takeshima et al. | |

FOREIGN PATENT DOCUMENTS

| | | |
|---|---|---|
| CN | 101222979 | 7/2008 |
| JP | 2001-009279 | 1/2001 |
| JP | 2002-320917 | 11/2002 |
| JP | 2004-331444 | 11/2004 |
| JP | 2006-272250 | 10/2006 |
| JP | 2007-21387 | 2/2007 |
| WO | WO 2008/146823 | 12/2008 |
| WO | WO 2009/001962 A1 | 12/2008 |

OTHER PUBLICATIONS

H.-S. Oh et al., "Modification of Polyol Process for Synthesis of Highly Platinum Loaded Platinum-Carbon Catalysts for Fuel Cells," Journal of Power Sources, vol. 183, pp. 600-603 (2008).

* cited by examiner

*Primary Examiner* — Melvin C Mayes
*Assistant Examiner* — Colette Nguyen
(74) *Attorney, Agent, or Firm* — Finnegan, Henderson, Farabow, Garrett & Dunner, LLP

(57) ABSTRACT

A nanoparticle carrying method making a carrier adsorb ammonium ions, making the nanoparticles adsorb an organic acid, and making the carrier and the nanoparticles contact each other in a basic solution to thereby cause the carrier to adsorb the nanoparticles. Nanoparticles can be carried in high dispersion irrespective of superhydrophilicity.

3 Claims, 2 Drawing Sheets

NANOPARTICLE CARRYING METHOD

CROSS-REFERENCE TO RELATED APPLICATIONS

This application is a national phase application of International Application No. PCT/JP2009/056014, filed Mar. 18, 2009, the contents of which are incorporated herein by reference.

TECHNICAL FIELD

The present invention relates to a method of making a carrier carry nanoparticles.

BACKGROUND ART

There are known methods for making automobile exhaust gas purification catalysts and catalysts, first and foremost, and carriers such as porous oxides with heat resistance and large surface areas carry catalyst particles or catalyst auxiliary particles and the like. To secure a large reactive surface area so as to increase the reaction efficiency as a catalyst etc., catalyst particles or catalyst auxiliary particles and the like are preferably carried highly dispersed as fine nano-level particles.

For example, Japanese Patent Publication (A) No. 2001-9279 discloses an $NO_x$ storage reduction catalyst using a carrier comprising an alumina particles coated on their surfaces with titania particles as catalyst auxiliary particles (for restoration from S poisoning) of a particle size of 10 nm or less. Further, as a method of production of the same, it is disclosed to set the pH of a slurry comprised of alumina particles and titania sol to less than 5, then afterward raise the pH so as to coat the surface of the alumina particles with titania fine particles. However, with this method, as shown in FIG. 10 of the same publication, in the process of the rise in pH, the titania sol passes through the isoelectric point, so aggregates and immediately coarsens at that point. At the pH at this time, the alumina is charged and does not aggregate together with the titania sol. Further, as the pH is raised, the titania sol aggregate begins to be charged negatively. However, redispersion takes a long time in comparison to aggregation, so the titania aggregates are adsorbed on the alumina particles while still in the aggregated coarsened state. In such a way, in the method of production of Japanese Patent Publication (A) No. 2001-9279, it is very likely that the surfaces of the alumina particles will not be coated by titania fine particles, but that the alumina particles will simply be mixed with the aggregated titania particles.

Also, Japanese Patent Publication (A) No. 2004-331444 discloses a method of production of an exhaust gas purification catalyst comprising adding an aqueous solution of a titania-containing water soluble organic compound to a slurry containing alumina particles, drying it, and firing it to make the alumina surface carry titania. However, with such a solution reaction, an alumina-titania composite oxide forms, the heat resistance drops, the surface area as a carrier ends up falling, and titania nanoparticles cannot be kept carried at a high dispersion.

Further, Japanese Patent Publication (A) No. 2006-272250 discloses a method of aligning particles by preparing two or more types of colloids covered by a carboxyl group-containing polymer or an amine group-containing polymer or other protective material and utilizing the collection of the different colloids due to the affinity acting between the protective materials. However, in this method, it is difficult to definitely prevent aggregation between the colloids, so a state in which nanoparticles are carried in high dispersion cannot be obtained with a stability.

As opposed to this, the Applicants disclosed in WO 2009/001962 a method of making alumina adsorb $NH_4^+$ ions and making superhydrophilic titania, on which $OH^-$ ions are adsorbed, be adsorbed/carried on the alumina through the potential difference. This thereby allows the alumina particles to carry titania nanoparticles on their surfaces in a high dispersion.

That is, in the above method, both the alumina and the titania are charged negatively in a weak basic solution, but the $NH_4^+$ ions are selectively adsorbed on only the alumina and are not adsorbed much at all on the titania, so a potential difference is generated between the alumina and titania. This potential difference causes titania nanoparticles to be adsorbed and carried on the alumina surface. This selective adsorption type carrying mechanism is made possible by the special condition that the titania is superhydrophilic, so the $OH^-$ ion adsorption is strong and the $NH_4^+$ ion adsorption is weak.

Therefore, the above method is a method which becomes first possible when the carried titania is superhydrophilic and cannot be applied to other particles.

Thus, a high dispersion carrying method that can be applied to nanoparticles other than titania had been sought.

DISCLOSURE OF THE INVENTION

The present invention has as its object to provide a method of carrying nanoparticles in a high dispersion irrespective of superhydrophilicity.

The above object, according to the present invention, is achieved by a nanoparticle carrying method making a carrier adsorb ammonium ions, making the nanoparticles adsorb an organic acid, and making the carrier and the nanoparticles contact each other in a basic solution to thereby cause the carrier to adsorb the nanoparticles.

In the basic solution, the carrier adsorbing the ammonium ion is partially positively charged, and the nanoparticles adsorbing the organic acid are negatively charged to a great extent, so the potential difference between the carrier and nanoparticles causes the carrier to adsorb the nanoparticles. The carriers and the nanoparticles are the same in potential, so do not aggregate and are kept in a high dispersion.

The carrier is typically alumina, but is not necessarily limited to this. The invention can also be applied to zirconia, titania, and the like used as carriers for exhaust gas purification catalysts and the like in the past first of all and to other oxides and composite oxides used generally as carriers.

The nanoparticles do not have to be particularly limited so long as an organic acid can be adsorbed on them and may be oxides and composite oxides of transition metals, rare earth elements, and the like and nitrides, carbides, and the like with surfaces involved in carrying which are oxidized.

As the organic acid, succinic acid, malic acid, tartaric acid, citric acid, and other polycarboxylic acids may be used.

BEST MODE FOR CARRYING OUT THE INVENTION

The adsorption/carrying mechanism according to the present invention will be explained with reference to a typical case using alumina particles as a carrier and using ceria sol as nanoparticles.

Figure 1:
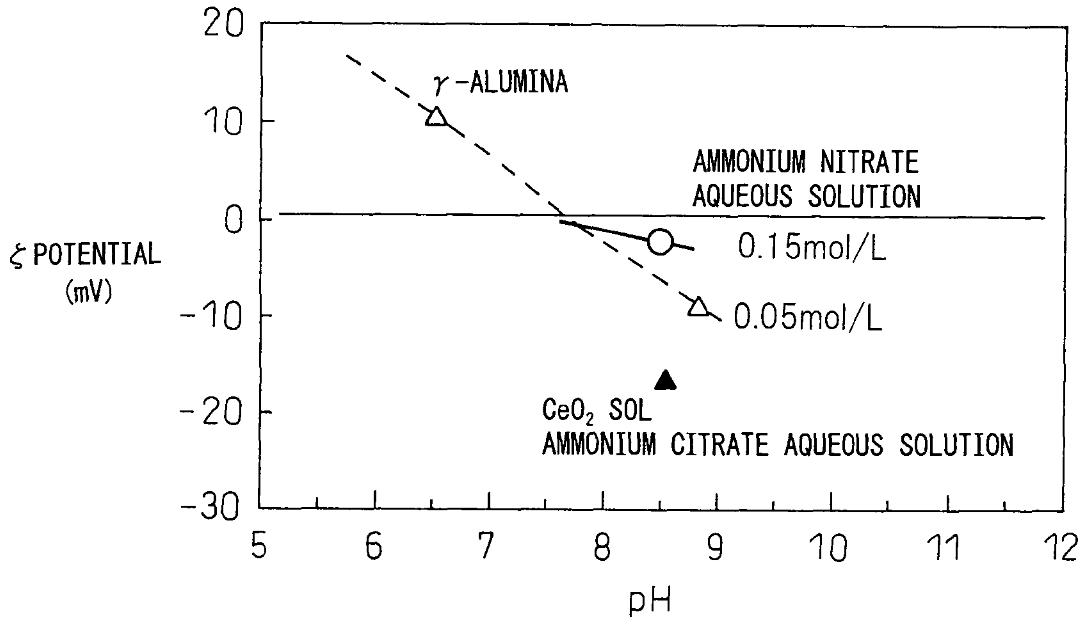
FIG. 1 shows the potentials of alumina particles and ceria sol particles against the pH value of a solution when making a carrier of alumina particles adsorb ammonium ions and making nanoparticles of ceria sol adsorb citric acid.

FIG. 1 shows the ζ potentials of alumina particles and ceria sol particles against the pH value of a solution when making a carrier of alumina particles (average particle size on the order of microns, with mesopores several nanometers to several dozen nanometers large) adsorb ammonium ions and making nanoparticles (average particle size: primary particle size 5 nm approximately, aggregated secondary particle size 10 to 15 nm) of ceria sol adsorb citric acid As shown in the drawing, at the weak base side, alumina is negatively charged in a 0.05 mol/liter ammonium nitrate aqueous solution (the blank triangle plot in the figure), ceria sol is also negatively charged in an ammonium citrate aqueous solution (the solid triangle plot in the figure), and the potential difference between the two in this case is insufficient for causing adsorption.

If the concentration of ammonium nitrate aqueous solution is increased to 0.15 mol/liter, the charge of alumina will be negative, although extremely small (blank circle plot in the drawing), and the charge of ceria sol will not change (solid triangle plot).

Figure 2:
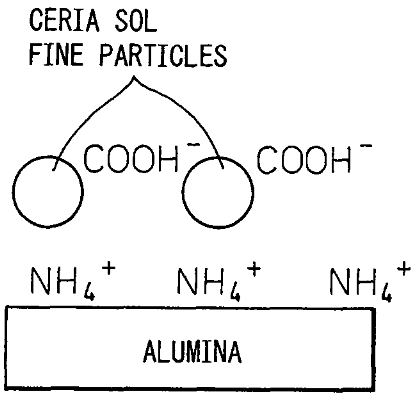
FIG. 2 schematically shows a partial positive charge on the alumina particle surface and a negative charge on the ceria sol particle surface.

As shown in FIG. 2, at the surface of the alumina particles, if salt concentration is increased, adsorption of the ammonium ions increases resulting in a partially positively charged state. The surface of the alumina particles shown in the drawing becomes partially positively charged in state due to the ammonium ions $NH_4^+$. Areas other than the parts labeled with $NH_4^+$ adsorb $OH^-$, so as a whole, the surface is negatively charged.

On the other hand, the surface of the ceria particles adsorbs citric acid. The carboxyl groups other than the ones used for adsorption partially dissociate and therefore the particles are negatively charged. This negative charge does not change with the change of concentration of the small amount of ammonium ions (FIG. 1). Note that, FIG. 2 simplifies the coordination of citric acid on ceria sol and shows only the $COOH^-$ (carboxyl groups).

Thus, the alumina particle surface is partially positively charged due to the ammonium ions that are adsorbed on it, and the ceria particle surface is negatively charged due to the organic acid such as citric acid that is adsorbed on it, so the potential difference between them causes selective adsorption of ceria nanoparticles on the alumina particle surface.

At such a time, making the surfaces of both particles be completely charged positively and negatively is liable to make the adsorption speed too fast and impede ceria nanoparticle dispersability. In a state when the alumina particle surface is partially positively charged, the selectability and slow speed are believed to be beneficial to dispersability.

EXAMPLES

Example 1

According to the present invention, a carrier of alumina particles was made to carry nanoparticles of ceria sol by the following steps and conditions.

(1) Preparation of Ceria Sol

First, ammonia water was added to a 0.5M cerium nitrate solution to bring the pH to 6 and obtain precipitates from which moisture was the separated.

Next, the precipitates were added and dispersed in a 0.5M citric acid solution to which ammonia water was then added to bring the pH to 8 and obtain a colloid of uniformly dispersed nanoparticles.

The obtained ceria nanoparticles had an aggregated secondary particle size of 10 to 15 nm and a primary particle size of 5 nm or so.

(2) Adsorption on Activated Alumina

Figure 3:
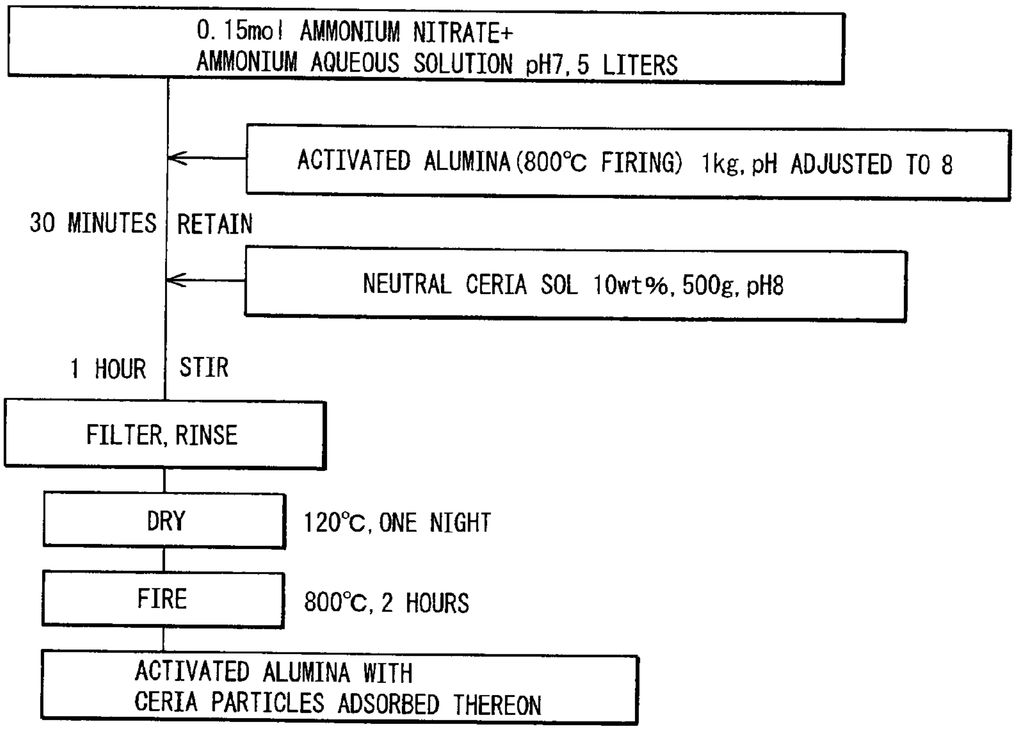
FIG. 3 is a flow chart showing a carrying method according to Example 1 of the present invention.
Figure 4:
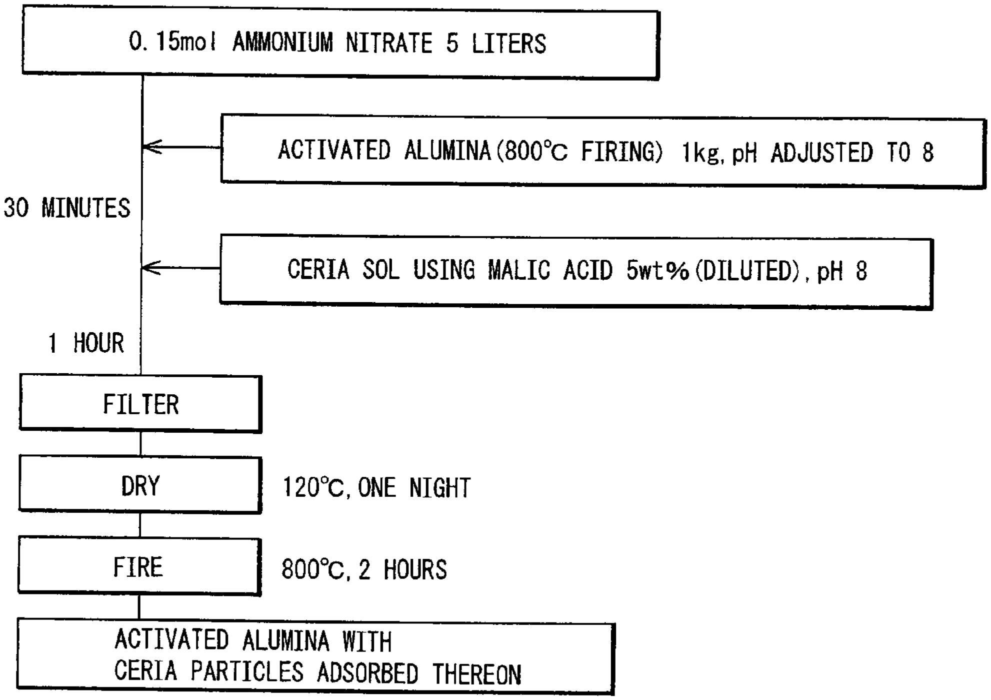
FIG. 4 is a flow chart showing a carrying method according to Example 2 of the present invention.

The steps shown in the flow sheet shown in FIG. 3 were used to make the titania sol prepared above be adsorbed on the activated alumina.

Here, the titania sol was prepared so that Ce/Al=5/100 (atomic ratio).

First, a 0.15M ammonium nitrate aqueous solution was prepared to give a pH 8. To this, 1 kg of dried activated alumina was added and the result stirred to remove gas from the powder pores. After approximately 30 minutes, 500 g of the above-obtained neutral ceria sol was gradually added in suitable amounts. The total amount was added in approximately 5 minutes. After this, the mixture continued to be stirred for approximately 1 hour. It was then filtered, washed with water once, and dried at 120° C. for one night. Then, the mixture was fired at 800° C. for 2 hours. It could be confirmed from the weight after firing that nearly the total weight of ceria sol was carried.

Comparative Example 1

Dried activated alumina was added to distilled water, stirred, then the result filtered and the weight measured to find the supply rate. Next, a cerium nitrate aqueous solution prepared in advance was readied. The cerium nitrate solution was supplied to the dried alumina powder so that the concentration at this time became Ce/Al=5/100 (atomic ratio) based on the above supply rate. Then, the result was filtered and dried at 80° C., after which it was fired at 800° C. for 2 hours. The amount of ceria ($CeO_2$) carried was set so that Ce/Al=5/100 (atomic ratio).

Conventional Example 1

Cerium nitrate and aluminum nitrate were mixed so that Ce/Al=5/100 (atomic ratio). An aqueous solution of 0.5M as the total metal was readied. Next, while stirring the aqueous solution, ammonia water was dropped, comparatively rapidly, to bring the pH to 6.5. Then, after 2 hours of stirring, ammonia water was further dropped to bring the pH to 7.8. Then, stirring was continued slowly for 1 hour. Next, the result was filtered, dried at 80° C. for one night, and fired in the atmosphere at 800° C. for 2 hours.

Table 1 shows actual measurement values of the surface areas of samples obtained at Example 1, the comparative example, and the conventional example.

TABLE 1

| Surface Area of Carrier (Firing at 800° C. for 2 Hours) | | |
|---|---|---|
| | Carrier types | Surface area ($m^2/kg$) |
| | Ceria | 35.2 |
| Conventional Example 1 | Ceria alumina composite oxide | 115.0 |
| Comparative Example 1 | Activated alumina + cerium nitrate absorption* | 145.2 |
| Example 1 | Activated alumina + ceria fine particle absorption* | 172.3 |
| | Activated alumina | 180.5 |

*Ce/Al atomic ratio = 5/100

Example 1, despite having an amount of Ce added the same as the comparative example, has a larger surface area compared to the comparative example. It is clear that the drop in surface area at the time of firing at 800° C. was able to be made smaller.

The conventional example was in a state where Ce ions and Al ions intermingled and did not have the high heat resistance that alumina normally has. It is believed that the surface area drop was large at the parts that became cerium aluminate—which has a relatively low heat resistance.

The comparative example had Ce ions concentrated at the activated alumina grain boundaries and cerium aluminate formed at the grain boundaries, whereby, as a result, it is believed alumina particle rearrangement occurred and the surface area dropped.

As opposed to this, Example 1 had the alumina framework and grain boundaries maintained in the initial state and had ceria nanoparticles adsorbed/carried on the alumina particle surface, so as a result there was almost no drop in surface area. It is believed that the surface area dropped slightly because, according to data, the density of ceria of 7.2 $g/cm^3$ is larger than the density of activated alumina of 3.78 $g/cm^3$.

Example 2

Ceria sol (colloid) was prepared by the following steps.

First, ammonia water was added to a 0.5M cerium nitrate solution to bring the pH to 6 and obtain precipitates from which moisture was then separated.

Next, 0.8M malic acid solution was added and dispersed and ammonia water was added to bring the pH to 8 and obtain a colloid of uniformly dispersed nanoparticles.

Below, similar to Example 1, the solution was stirred for one hour to make the activated alumina adsorb the ceria sol. The laser scattering of the liquid after adsorption was measured, but no scattering from nanoparticles was observed.

Afterwards, stirring was further continued for one hour. The solution was filtered and dried at 120° C. for one night. Next, it was fired at 800° C. for 2 hours. It could be confirmed from the weight after firing that nearly the total weight of ceria sol was carried.

Adsorption on the alumina carrier was possible with a constant pH value, no effect on the ammonium ions, and no impediment of ceria sol dispersion.

Example 3

In the present example, iron oxide nanoparticles were carried on the alumina carrier.

Iron oxide sol (colloid) was prepared by the following steps.

First, ammonia water was added to a 0.5M ferrous nitrate solution to bring the pH to 8 and obtain precipitates from which the moisture was then separated.

Then, the precipitates were added and dispersed in 0.5M citric acid, and ammonia water was added to bring the pH to 8 and obtain a colloid with uniformly dispersed nanoparticles.

The obtained iron oxide nanoparticles had an aggregated secondary particle size of 10 to 15 nm, and a primary particle size of 5 nm or so.

Below, operations similar to Example 1 were carried out to make the iron oxide nanoparticles be adsorbed on the activated alumina carrier. Laser scattering of the liquid after adsorption was measured, but scattering from the nanoparticles was not observed.

INDUSTRIAL APPLICABILITY

According to the present invention, there is provided a method of carrying nanoparticles in a high dispersion irrespective of superhydrophilicity.

The method of the present invention is useful for many types of catalysts, from automobile exhaust gas purification catalysts to catalysts for conversion of energy from the sun. This art enables the occurrence of high speed reactions that had not been conventionally achievable and is vital in the upcoming energy revolution.

The invention claimed is:

1. A nanoparticle carrying method comprising:

treating a carrier with ammonium ions such that the carrier adsorbs ammonium ions prior to contact with the nanoparticles;

making the nanoparticles adsorb an organic acid prior to contact with the carrier, including adjusting a pH of a solution containing the nanoparticles and the organic acid to 8; and thereafter making the carrier and the nanoparticles contact each other in a basic solution to thereby cause the carrier to adsorb the nanoparticles;

wherein the nanoparticles are ceria and the carrier is alumina.

2. A method as set forth in claim 1, wherein the organic acid is a polycarboxylic acid.

3. A method as set forth in claim 1, wherein the step of making the carrier and the nanoparticles contact each other includes adding the carrier to the basic solution followed by adding the nanoparticles to the basic solution.

* * * * *